(12) United States Patent
Fuchimukai

(10) Patent No.: US 6,831,698 B2
(45) Date of Patent: Dec. 14, 2004

(54) CARD SLOT DOOR LOCKING MECHANISM

(75) Inventor: Atsushi Fuchimukai, Tokyo (JP)

(73) Assignee: PENTAX Corporation, Tokyo (JP)

( * ) Notice: Subject to any disclaimer, the term of this patent is extended or adjusted under 35 U.S.C. 154(b) by 809 days.

(21) Appl. No.: 09/759,301

(22) Filed: Jan. 16, 2001

(65) Prior Publication Data
US 2001/0008581 A1 Jul. 19, 2001

(30) Foreign Application Priority Data
Jan. 19, 2000 (JP) .......................................... 2000-10811

(51) Int. Cl.[7] .............................................. H04N 5/225
(52) U.S. Cl. ........................ 348/373; 361/684; 361/728; 439/310
(58) Field of Search ................................ 348/373, 374, 348/375, 376; 360/99.06; 361/684, 685, 686, 737, 724, 683, 799, 798, 754, 728; 386/118; 439/159, 62, 310

(56) References Cited

U.S. PATENT DOCUMENTS

| | | | | |
|---|---|---|---|---|
| 4,797,761 A | * | 1/1989 | Cocco | ...................... 360/99.06 |
| 5,657,081 A | * | 8/1997 | Kurahashi | ................ 348/231.7 |
| 5,701,216 A | | 12/1997 | Yamamoto et al. | |
| 5,781,232 A | * | 7/1998 | Ejima | ....................... 348/231.7 |
| 5,805,219 A | * | 9/1998 | Ejima et al. | ................. 348/375 |
| 5,828,918 A | | 10/1998 | Abe et al. | |
| 5,907,354 A | * | 5/1999 | Cama et al. | ............... 348/231.7 |
| 6,377,451 B1 | * | 4/2002 | Furuya | ........................ 361/686 |
| 6,421,247 B1 | * | 7/2002 | Fuchimukai | ................. 361/759 |
| 6,493,033 B1 | * | 12/2002 | Glogan et al. | .............. 348/375 |

* cited by examiner

Primary Examiner—Andrew Christensen
Assistant Examiner—Heather R. Long
(74) Attorney, Agent, or Firm—Greenblum & Bernstein, P.L.C.

(57) ABSTRACT

A card slot door locking mechanism including a pair of doors, each of the pair of doors being rotatable between a closed position and an open position, and being biased to the closed position; a pair of open guide surfaces which are formed on each respective door of the pair of doors so that the pair of doors concurrently rotate to the open position when the pair of open guide surfaces are concurrently pushed by the removable card; and a pair of barrier surfaces which are formed on each respective door of the pair of doors so that at least one of the pair doors is prevented from rotating toward the open position when at least one of the pair of barrier surfaces is pushed by an object other than the removable card without pushing the pair of open guide surfaces concurrently.

13 Claims, 7 Drawing Sheets

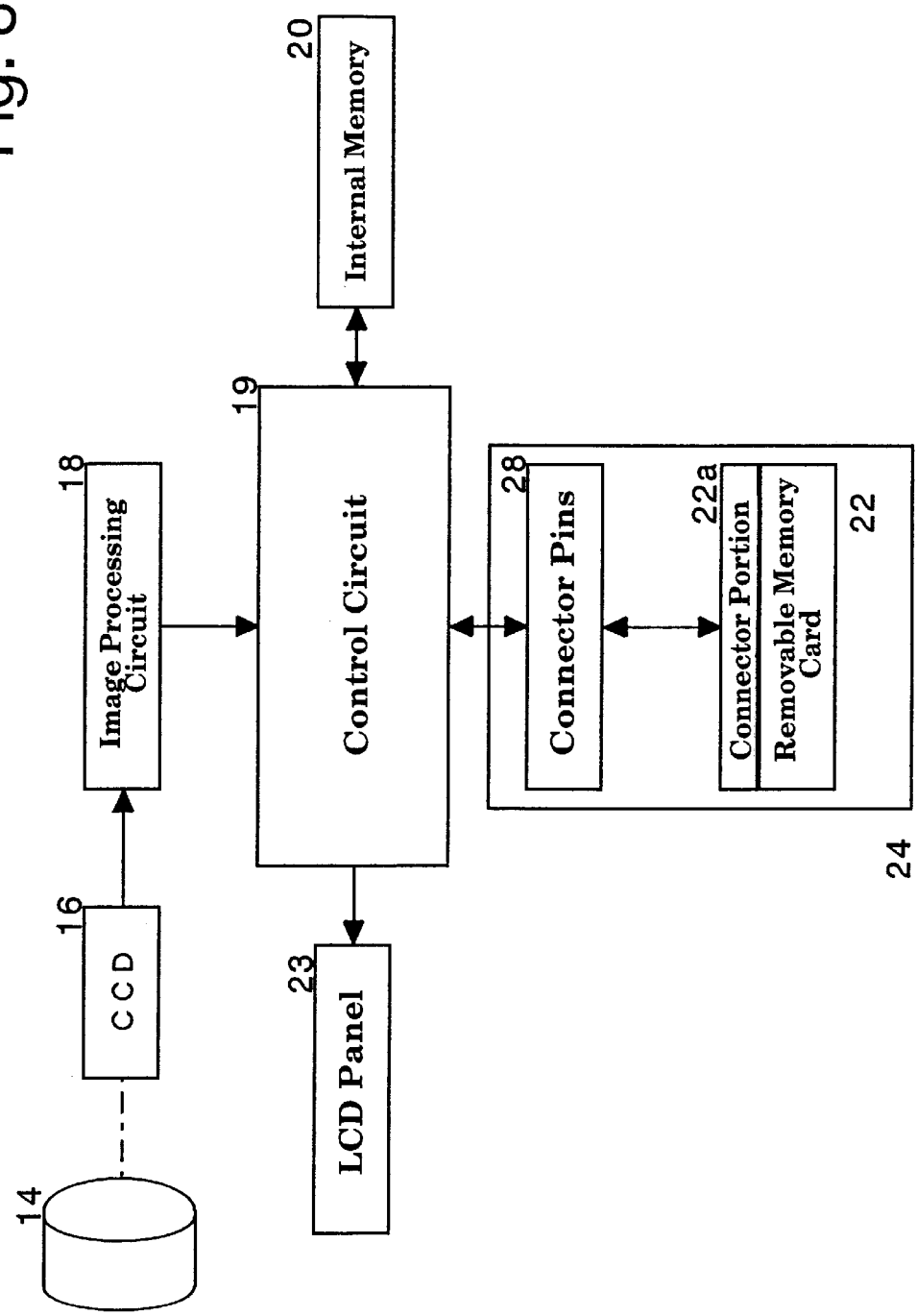

CARD SLOT DOOR LOCKING MECHANISM

BACKGROUND OF THE INVENTION

1. Field of the Invention

The present invention relates to a mechanism for locking a door of a card slot formed in an electronic device such as a digital camera. The locking mechanism unlocks the door to allow a removable card to be inserted into the card slot only when the removable card is a compatible removable card that is connectable to the electronic device.

2. Description of the Related Art

Various types of removable cards having different shapes and sizes which are inserted into a card slot formed in an electronic device such as a digital camera (for instance, removable memory cards which are utilized as image storing media for digital cameras) are available on the market. Therefore, there is the possibility of an incompatible removable card, having a smaller size than a compatible removable card, being inserted into the card slot by mistake. Once such an incompatible removable card is inserted into the card slot, it is often the case that the card jams in the card slot, and in the worst cases, the card connector provided in the card slot is damaged or foreign object is accidentally inserted into the card slot.

SUMMARY OF THE INVENTION

It should be noted that in the present specification the length of an insertion end face of a removable card in the lengthwise direction is referred to as the width of the removable card, and the length of the same insertion end face in the transverse direction is referred to as the thickness of the removable card. The lengthwise direction of the card slot (insertion opening of the card slot) corresponds to the widthwise direction of the removable card.

The primary object of the present invention is to provide a card slot door locking mechanism having simple and low-cost structure which makes it possible to effectively prevent any incompatible removable card or foreign object from entering into the card slot.

To achieve the object mentioned above, according to an aspect of the present invention, a card slot door locking mechanism is provided, including a pair of doors, each of the pair of doors being rotatable between a closed position to close a card slot and an open position to allow a removable card to be inserted into the card slot, and being biased to the closed position; a pair of open guide surfaces, each of the pair of open guide surfaces being formed on each respective door of the pair of doors so that the pair of doors concurrently rotate to the open position when the pair of open guide surfaces are concurrently pushed by the removable card, the pair of open guide surfaces being apart from each other in a lengthwise direction of the card slot; and a pair of barrier surfaces, each of the pair of barrier surfaces being formed on each respective door of the pair of doors, positioned between the pair of open guide surfaces in the lengthwise direction of the card slot, so that at least one of the pair doors is prevented from rotating toward the open position when at least one of the pair of barrier surfaces is pushed by an object other than the removable card without pushing the pair of open guide surfaces concurrently.

Preferably, each of the pair of open guide surfaces is inclined with respect to a card insertion direction so that a point on the each of the pair of open guide surfaces moves substantially toward the closing direction of each respective the pair of doors as the point moves along the card insertion direction.

Preferably each of the pair of barrier surfaces is inclined with respect to a card insertion direction so that a point on the each of the pair of barrier surfaces moves substantially toward the opening direction of each respective the pair of doors as the point moves along the card insertion direction.

In an embodiment, the card slot door locking mechanism further includes at least one stopper which determines the closed position of each of the pair of doors.

The card slot can be incorporated in a digital camera, and the removable card can be a removable memory card in which image data is recorded.

According to another aspect of the present invention, a card slot door locking mechanism is provided, including a first door and a second door, each of the first and second doors being rotatable between a closed position to close a card slot and an open position to allow a removable card to be inserted into the card slot, and being biased to the closed position; a first open guide surface formed on the first door and a second open guide surface formed on the second door, the first and second open guide surfaces being apart from each other in a lengthwise direction of the card slot; and a first barrier surface formed on the first door and a second barrier surface formed on the second door, the first and second barrier surfaces being positioned between the first open guide surface and the second open guide surface in the lengthwise direction of the card slot. The first door and the second door concurrently rotate to the open position when the first and second open guide surfaces are concurrently pushed toward a card insertion direction by the removable card. At least one of the first and second doors is prevented from rotating toward the open position when at least one of the first and second barrier surfaces is pushed toward the card insertion direction by an object other than the removable card without pushing the first and second open guide surfaces concurrently.

Preferably, the first open guide surface is positioned closer to an insertion opening of the card slot than the first barrier surface, and the second open guide surface is positioned closer to the insertion opening of the card slot than the second barrier surface.

In an embodiment, each of the first door and the second door includes two parallel arms, each of which is pivoted at one end thereof and extends substantially toward the card insertion direction from the one end which is pivoted; and a barrier arm which extends between the two parallel arms in the lengthwise direction of the card slot to connect the other ends which are not pivoted of the two parallel arms together. The first open guide surface is formed on one of the two parallel arms of the first door, and the second open guide surface is formed on one of the two parallel arms of the second door. The first barrier surface is formed on the barrier arm of the first door, and the second barrier surface is formed on the barrier arm of the second door.

In an embodiment, the two parallel arms of the first door and the two parallel arms of the second door are pivoted about a common shaft which extends substantially parallel to the lengthwise direction of the card slot.

In an embodiment, the first open guide surface and the second open guide surface substantially lie at the same position with respect to the card insertion direction, and the first barrier surface and the second barrier surface substantially lie at the same position with respect to the card insertion direction.

In an embodiment, the first barrier surface includes a plurality of first barrier surfaces, the second barrier surface includes a plurality of second barrier surfaces, and the plurality of first barrier surfaces and the plurality of second barrier surfaces are arranged along the lengthwise direction of the card slot in an alternate configuration.

In an embodiment, the first barrier surface is positioned adjacent to the second open guide surface in the lengthwise direction of the card slot, and the second barrier surface is positioned adjacent to the first open guide surface in the lengthwise direction of the card slot.

According to another aspect of the present invention, a card slot door locking mechanism is provided, including a first door which is rotatable between a first-door-closed position, in which the first door closes a card slot, and a first-door-open position, in which the first door opens the card slot to allow a removable card to be inserted into the card slot, the first door being biased to rotate in a direction towards the first-door-closed position; a second door which is rotatable between a second-door-closed position, in which the second door closes the card slot, and a second-door-open position, in which the second door opens the card slot to allow the removable card to be inserted into the card slot, the second door being biased to rotate in a direction towards the second-door-closed position; a first open guide surface which is formed on the first door so that the first door rotates toward the open position thereof when a pushing force is applied against the first open guide surface in a card insertion direction; a second open guide surface which is formed on the second door so that the second door rotates toward the open position thereof when a pushing force is applied against the second open guide surface in the card insertion direction; a first barrier surface which is formed on the first door so as to prevent the first door from rotating toward the open position thereof when a pushing force is applied against the first barrier surface in the card insertion direction without applying a pushing force on the first open guide surface; and a second barrier surface which is formed on the second door so as to prevent the second door from rotating toward the open position thereof when a pushing force is applied against the second barrier surface in the card insertion direction without applying a pushing force on the second open guide surface. The first open guide surface and the second open guide surface are arranged apart from each other in a lengthwise direction of the card slot. The first barrier surface and the second barrier surface are positioned between the first open guide surface and the second open guide surface in the lengthwise direction of the card slot.

The present disclosure relates to subject matter contained in Japanese Patent Application No.2000-010811 (filed on Jan. 19, 2000) which is expressly incorporated herein by reference in its entirety.

BRIEF DESCRIPTION OF THE DRAWINGS

The present invention will be described below in detail with reference to the accompanying drawings in which:

FIG. 8 is a block diagram of fundamental elements of the digital camera shown in FIG. 1;

DESCRIPTION OF THE PREFERRED EMBODIMENTS

Figure 1:
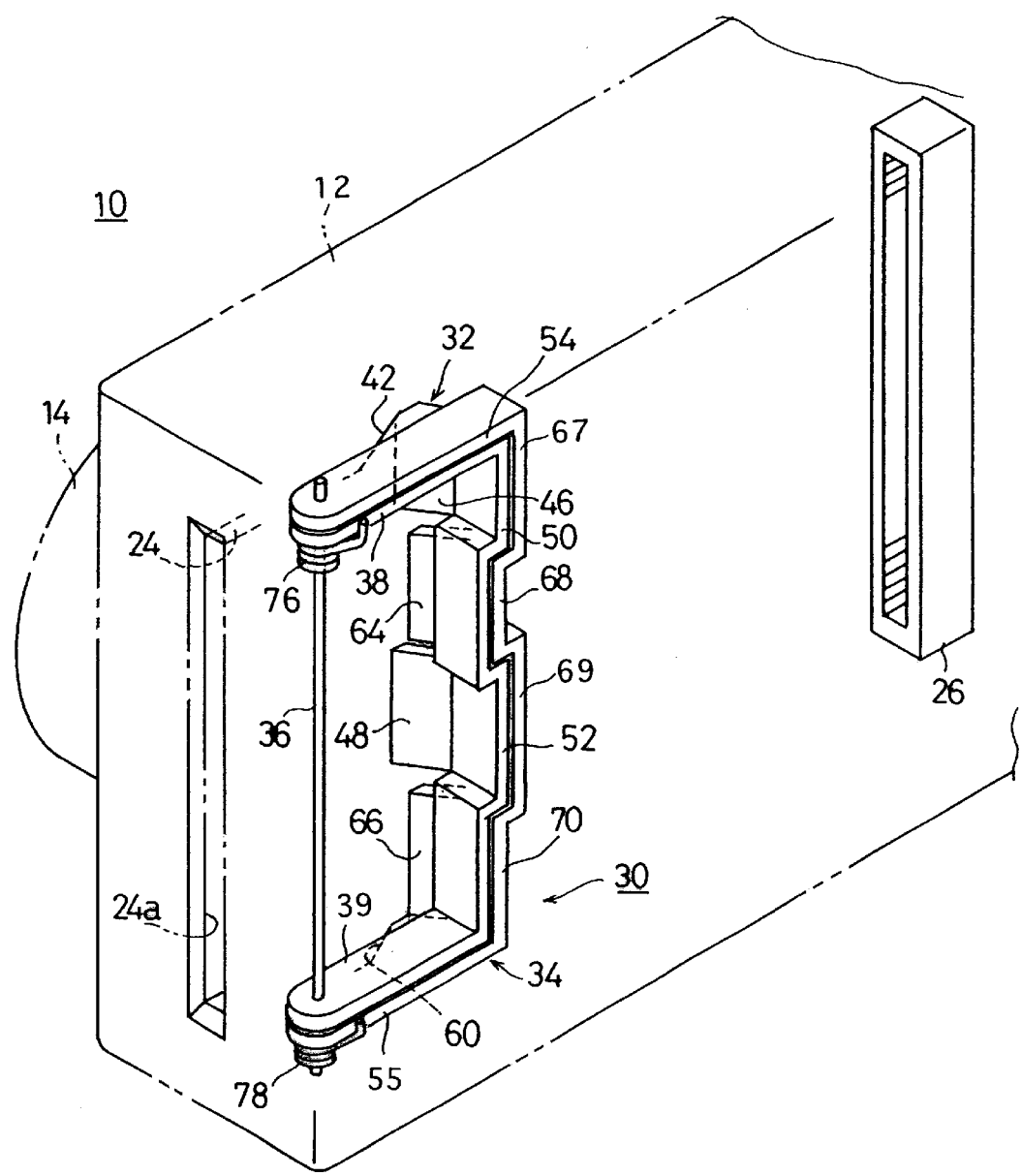
FIG. 1 is a perspective view of fundamental elements of an embodiment of a card slot door locking mechanism, provided in a digital camera, according to the present invention, viewed from behind of the digital camera, part of the camera body of the digital camera being indicated by two-dot chain lines.

FIG. 8 shows a block diagram of fundamental elements of an embodiment of a digital camera according to the present invention. As shown in FIG. 8, the digital camera 10 is provided with a photographic lens (photographic optical system) 14, a CCD 16, an image processing circuit 18, a control circuit 19, an internal memory 20 and an LCD panel 23. The digital camera 10 is further provided with a card slot 24 and a series of connector pins 28. The photographic lens 14 is positioned at the front of a camera body 12 of the digital camera 10. The object image is focused on the CCD 16 through the photographic lens 14. The image formed on the CCD 16 is converted into digital image data via the image processing circuit 18. The digital image data is stored in the internal memory 20 or a removable memory card (e.g., a CompactFlash card, PCMCIA card or SmartMedia card) 22. The LCD panel 23 is fixed to an external face of the camera body 12. The image formed on the CCD 16 through the photographic lens 14, the image read out of the internal memory 20, or the memory card 22 can be indicated on the LCD panel 23.

The digital camera 10 is provided, on the camera body 12 on one side thereof as viewed in FIG. 1, with an insertion opening 24a of the card slot 24. The removable memory card 22 is inserted into the card slot 24 from the insertion opening 24a. The dimensions of the insertion opening 24a are determined to correspond to the width and thickness of the compatible removable memory card 22 so that any incompatible card or foreign object having dimensions greater than those of the removable memory card 22 cannot be inserted into the card slot 24. The digital camera 10 is provided at the inner end of the card slot 24 with a receptacle 26 to which the removable memory card 22 can be connected. The series of contact pins 28 which are respectively engageable with a corresponding series of receptacle contacts formed on a connector portion 22a (see FIG. 8) of the removable memory card 22 are formed within the receptacle 26.

The digital camera 10 is provided in the card slot 24 with a card slot door locking mechanism 30 which allows a removable card to be fully inserted into the card slot 24 only when the removable card is a compatible removable memory card. The card slot door locking mechanism 30 is provided with a pair of doors, i.e., a first door 32 and a second door 34. These doors 32 and 34 are pivoted about a common shaft 36 so that the first and second doors 32 and 34 can rotate about the shaft 36 independently of each other. The shaft 36 extends substantially parallel to the lengthwise direction of the insertion opening 24a (i.e., the lengthwise direction of the card slot 24). The shaft 36 is positioned in the camera body 12 slightly behind the insertion opening 24*a*. The card slot door locking mechanism 30 allows a removable memory card to be inserted into the card slot 24 up to the position where the insertion end of the removable memory card is engaged with the series of contact pins 28 in the receptacle 26 only when the both first and second doors 32 and 34 are open at the same time. The structure of the card slot door locking mechanism 30 will be hereinafter discussed in detail.

Figure 2:
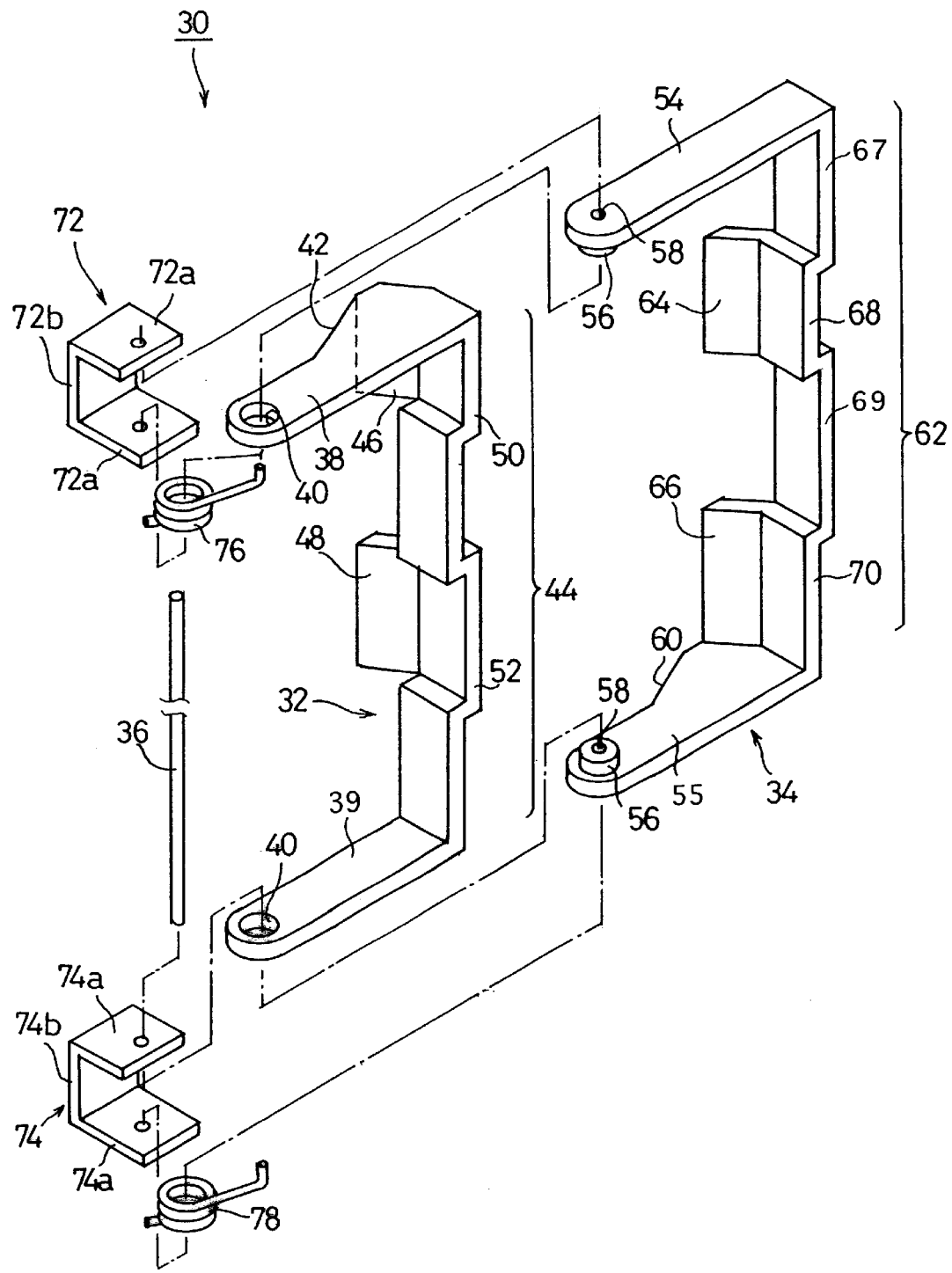
FIG. 2 is an exploded perspective view of fundamental elements of the card slot door locking mechanism shown in FIG. 1.

FIG. 2 shows an exploded perspective view of the card slot door locking mechanism 30. The first door 32 is provided with two parallel arms (upper and lower arms) 38 and 39 each extending in the card insertion direction when the first door 32 is in a closed position (first-door-closed position) thereof. Each of the upper arm 38 and the lower arm 39 of the first door 32 is provided at one end thereof (the left end as viewed in FIG. 2) with a circular hole 40 into which the shaft 36 is inserted. The upper arm 38 is provided on an outer edge thereof with an open guide surface 42 which is inclined in a direction so that a point on the open guide surface 42 moves substantially toward the closing direction of the first door 32 (i.e., toward the front of the camera body) as the point moves along the direction of insertion of the removable memory card 22.

The first door 32 is provided with a barrier plate (barrier arm) 44 which connects the inner end (the right end as viewed in FIG. 2) of the upper arm 38 with the inner end (the right end as viewed in FIG. 2) of the lower arm 39. The barrier plate 44 is positioned in the camera body 12 to extend in a direction substantially perpendicular to the card insertion direction, i.e., in the lengthwise direction (the vertical direction as viewed in FIG. 1) of the insertion opening 24*a* of the card slot 24. The barrier plate 44 is provided, on one side thereof which faces the insertion opening 24*a*, with an upper barrier surface 46 and a lower barrier surface 48 which lie in a common plane. The upper barrier surface 46 is positioned adjacent to the open guide surface 42, while the lower barrier surface 48 is positioned at an approximate center of the barrier plate 44 in the lengthwise direction thereof. Each of the upper and lower barrier surfaces 46 and 48 is inclined in a direction so that a point on each of the upper and lower barrier surfaces 46 and 48 moves substantially toward the opening direction of the first door 32 (i.e., toward the rear of the camera body) as the point moves along the direction of insertion of the removable memory card 22. In other words, the inclination direction of each of the upper and lower barrier surfaces 46 and 48 is approximately opposite to the inclination direction of the open guide surface 42. The barrier plate 44 is further provided with two recessed portions 50 and 52 each recessed inward, in a direction away from the insertion opening 24*a* (i.e., in the direction of insertion). The upper and lower barrier surfaces 46 and 48 are formed to extend from the recessed portions 50 and 52, respectively.

Similar to the first door 32, the second door 34 is provided with two parallel arms (upper and lower arms) 54 and 55 each extending in the card insertion direction when the second door 34 is in a closed position (second-door-closed position) thereof. The upper arm 54 and the lower arm 55 extend along the outer surfaces of the upper arm 38 and the lower arm 39 of the first door 32, respectively. Each of the upper arm 54 and the lower arm 55 of the second door 34 is provided, at one end thereof (the left end as viewed in FIG. 2) on an inner surface of the one end which faces that of the other arm 54 or 55, with a cylindrical projection 56 which is fitted on the circular hole 40 of the corresponding arm of the first door 32. Each of the upper arm 54 and the lower arm 55 of the second door 34 is provided, at one end thereof having the cylindrical projection 56, with an axial through hole 58 which extends through the axis of the corresponding cylindrical projection 56. The opposite ends of the shaft 36 are respectively fitted in the axial through holes 58 of the upper arm 54 and the lower arm 55, so that the second door 34 is rotatable about the shaft 36 in the camera body 12. The outer peripheral surface of each cylindrical projection 56 of the second door 34 is slidably engaged with the inner peripheral surface of each corresponding circular hole 40 of the first door 32, so that the first door 32 can rotate about the shaft 36 relative to the second door 34.

The second door 34 is provided on an outer edge of the lower arm 55 with an open guide surface 60 which is inclined in a direction so that a point on the open guide surface 60 moves substantially toward the closing direction of the second door 34 (i.e., toward the front of the camera body) as the point moves along the direction of insertion of the removable memory card 22. The second door 34 is provided with a barrier plate (barrier arm) 62 which connects the inner end (the right end as viewed in FIG. 2) of the upper arm 54 with the inner end (the right end as viewed in FIG. 2) of the lower arm 55.

The barrier plate 62 is positioned in the camera body 12 to extend parallel to the barrier plate 44 of the first door 32 in a direction substantially perpendicular to the card insertion direction, i.e., in the lengthwise direction (the vertical direction as viewed in FIG. 1) of the insertion opening 24*a* of the card slot 24. The barrier plate 62 is provided, on one side thereof which faces the barrier plate 44 of the first door 32, with an upper barrier surface 64 and a lower barrier surface 66 which lie in a common plane. The lower barrier surface 66 is positioned adjacent to the open guide surface 60 in the lengthwise direction of the barrier plate 62, while the upper barrier surface 64 is positioned between the lower barrier surface 66 and the upper arm 54. Similar to the upper and lower barrier surfaces 46 and 48 of the first door 32, each of the upper and lower barrier surfaces 64 and 66 is inclined in a direction so that a point on each of the upper and lower barrier surfaces 64 and 66 moves substantially toward the opening direction of the second door 34 (i.e., toward the rear of the camera body) as the point moves along the direction of insertion of the removable memory card 22. In other words, the inclination direction of each of the upper and lower barrier surfaces 64 and 66 is approximately opposite to the inclination direction of the open guide surface 60. The barrier plate 62 is further provided with two recessed portions 67 and 69 each recessed inward, in a direction away from the insertion opening 24*a* (i.e., in the direction of insertion), so as to receive the two recessed portions 50 and 52 therein, respectively. The upper and lower barrier surfaces 64 and 66 are formed to extend from non-recessed portions 68 and 70 of the barrier plate 62, respectively.

Figure 3:
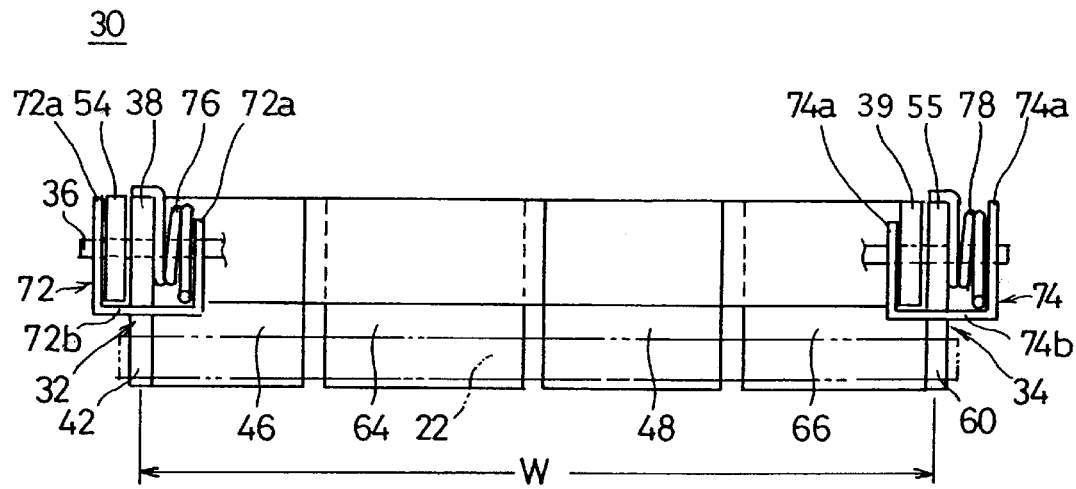
FIG. 3 is a plan view of the card slot door locking mechanism in a closed state, viewed from the insertion opening of the card slot.

Accordingly, when the rotational positions of the first and second doors 32 and 34 coincide with each other as shown in FIG. 1, the upper and lower barrier surfaces 46 and 48 of the first door 32 and the upper and lower barrier surfaces 64 and 66 of the second door 34 substantially lie in a common plane which extends in the lengthwise direction of the insertion opening 24*a* of the card slot 24 (see FIG. 3). As shown in FIG. 1, all of the upper and lower barrier surfaces 46 and 48 of the first door 32 and the upper and lower barrier surfaces 64 and 66 of the second door 34 are positioned between the upper and lower open guide surfaces 42 and 60 in the lengthwise direction of the insertion opening 24*a* of the card slot 24. Furthermore, the upper and lower barrier surfaces 46 and 48 of the first door 32 and the upper and lower barrier surfaces 64 and 66 of the second door 34 are positioned farther from the insertion opening 24a in the card insertion direction than the upper and lower open guide surfaces 42 and 60 in the card slot 24.

Each of the first and second doors 32 and 34 can rotate about the shaft 36 within a rotational range between the aforementioned closed position, in which the barrier surfaces 46, 48, 64 and 66 are positioned in the card slot 24, and an open position in which the barrier surfaces 46, 48, 64 and 66 retract from the card slot 24. The closed position of each of the first and second doors 32 and 34 is determined by upper and lower stoppers 72 and 74 (see FIG. 3). Each of the upper and lower stoppers 72 and 74 is in the form of a unshaped channel section. The upper stopper 72 is provided with two parallel plates 72a having coaxial through holes into which the upper end of the shaft 36 is inserted. The upper stopper 72 is further provided with a connection member 72b which connects the two parallel plates 72a together. Likewise, the lower stopper 74 is provided with two parallel plates 74a having coaxial through holes into which the lower end of the shaft 36 is inserted. The lower stopper 74 is further provided with a connection member 74b which connects the two parallel plates 74a together. Each of the upper and lower stoppers 72 and 74 is positioned in, and fixed to, the camera body 12. In FIG. 1, the upper and lower stoppers 72 and 74 are not shown.

Those pivoted ends of the upper arms 38 and 54 of the first and second doors 32 and 34, respectively, which are engaged with each other to be rotatable about the shaft 36 relative to each other are supported by the upper end of the shaft 36 between the two parallel plates 72a of the upper stopper 72, while the pivoted ends of the lower arms 39 and 55 of the first and second doors 32 and 34 which are engaged with each other to be rotatable about the shaft 36 relative to each other are supported by the lower end of the shaft 36 between the two parallel plates 74a of the lower stopper 74. The first door 32 can be held in the closed position thereof by making the upper arm 38 and the lower arm 39 abut against the connection members 72b and 74b, respectively. Likewise, the second door 34 can be held in the closed position thereof by making the upper arm 54 and the lower arm 55 abut against the connection members 72b and 74b, respectively.

Figure 4:
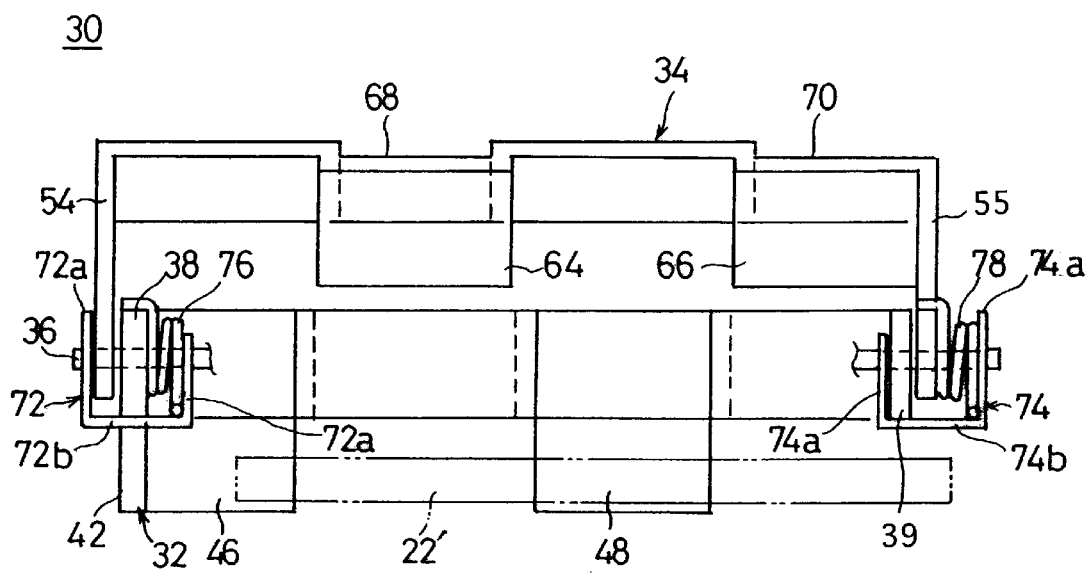
FIG. 4 is a plan view of the card slot door locking mechanism in an open state, viewed from the insertion opening of the card slot.

FIG. 3 shows a state where each of the first and second doors 32 and 34 is in the closed position thereof. FIG. 4 shows a state where the first door 32 is in the closed position thereof while the second door 34 is in the open position thereof. It should be noted that the amount of rotation of the second door 34 from the closed position to the open position is exaggerated in FIG. 4 for the purpose of illustration, so that the actual amount of rotation of the second door 34 from the closed position to the open position is smaller than that shown in FIG. 4 (see FIG. 6).

Figure 5:
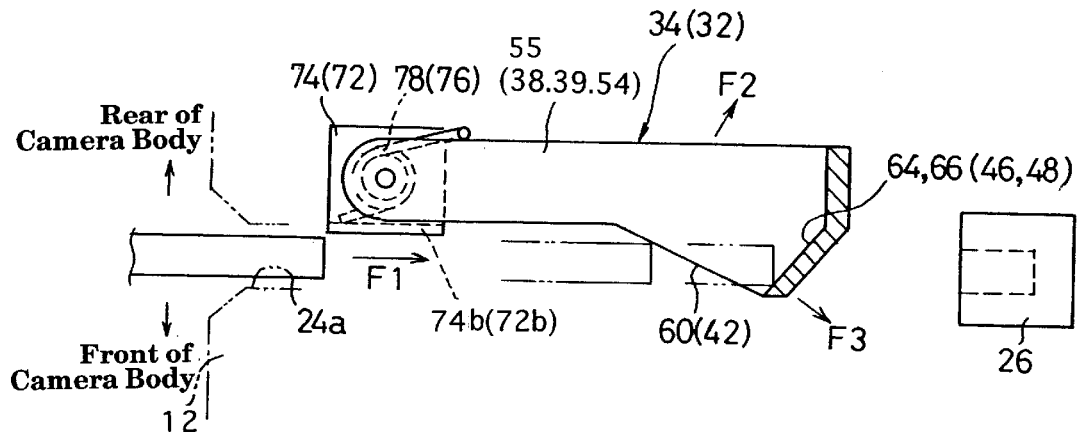
FIG. 5 is a bottom view of the card slot door locking mechanism, viewed from the bottom of the digital camera, showing an operating state.
Figure 6:
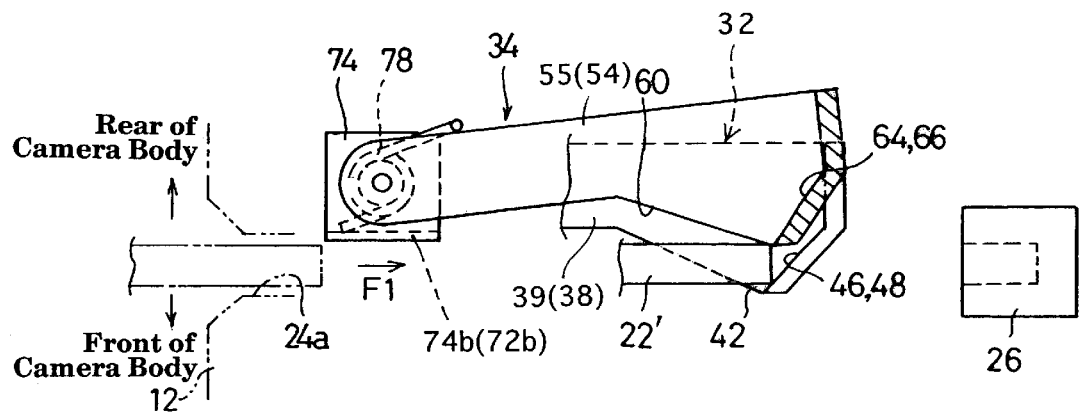
FIG. 6 is a view similar to that of FIG. 5 showing the card slot door locking mechanism in another operating state.
Figure 7:
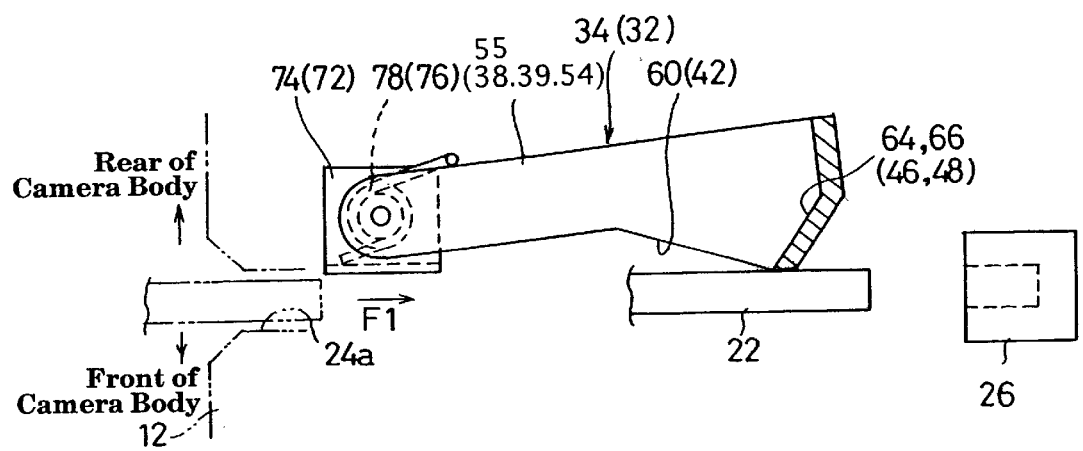
FIG. 7 is a view similar to that of FIG. 5 showing the card slot door locking mechanism in another operating state.

The first door 32 is constantly biased against the connection members 72b and 74b of the upper and lower stoppers 72 and 74 clockwise as viewed in FIGS. 5, 6 and 7 toward the closed position of the first door 32 by a coil torsion spring 76. Likewise, the second door 34 is constantly biased against the connection members 72b and 74b of the upper and lower stoppers 72 and 74 clockwise as viewed in FIGS. 5, 6 and 7 toward the closed position of the second door 34 by a coil torsion spring 78. The coil torsion spring 76 is loosely fitted on the shaft 36 and positioned between the lower plate 72a of the upper stopper 72 and the pivoted end of the upper arm 38 of the first door 32, with one and the other ends of the coil torsion spring 76 being engaged with the connection member 72b of the upper stopper 72 and the upper arm 38 of the first door 32, respectively. Likewise, the coil torsion spring 78 is loosely fitted on the shaft 36 and positioned between the lower plate 74a of the lower stopper 74 and the pivoted end of the lower arm 55 of the second door 34, with one and the other ends of the coil torsion spring 78 being engaged with the connection member 74b of the lower stopper 74 and the lower arm 55 of the second door 34, respectively.

The card slot door locking mechanism 30 having the above illustrated structure can effectively prevent any removable card or foreign object other than compatible removable memory cards having a predetermined width from entering into the card slot 24. FIG. 5 shows the card slot door locking mechanism 30, viewed from the bottom of the digital camera 10. Firstly, the operation of the second door 34 will be hereinafter discussed. When a card is inserted into the card slot 24 through the insertion opening 24a in the direction shown by an arrow F1 in FIG. 5, the insertion end (front end) of the card generally pushes the lower open guide surface 60, or the upper barrier surface 64 and/or the lower barrier surface 66 since the second door 34 is constantly biased toward the closed position thereof by the coil torsion spring 78 as mentioned above. If the insertion end of the card pushes the lower open guide surface 60, the second door 34 receives a force in the direction shown by an arrow F2 in FIG. 5 due to the direction of inclination of the lower open guide surface 60. Once such a force in the direction shown by the arrow F2 exceeds the spring force of the coil torsion spring 78, the second door 34 rotates from the closed position to the open position as shown in FIG. 6.

However, if the insertion end of the card pushes the upper barrier surface 64 and/or the lower barrier surface 66 after the card is inserted into the card slot 24 through the insertion opening 24a, the second door 34 receives a force in the direction shown by an arrow F3 in FIG. 5 due to the direction of inclination of the upper and lower barrier surfaces 64 and 66. Such a force in the direction shown by the arrow F3 acts on the second door 34 so as to rotate the second door 34 toward the closed position, so that the second door 34 does not open to thereby prevent the card from entering the card slot 24 beyond the second door 34. The second door 34 does not rotate in the closing direction beyond the closed position thereof even if the second door 34 receives a force in the direction shown by the arrow F3 when the second door 34 is held in the closed position, because the second door 34 is prevented from rotating in the closing direction beyond the closed position thereof by the connection members 72b and 74b of the upper and lower stoppers 72 and 74, respectively.

Secondly, the operation of the first door 32 will be hereinafter discussed. The operation of the first door 32 is similar to the operation of the second door 34 which has been discussed above. Namely, when a card is inserted into the card slot 24 through the insertion opening 24a in the direction shown by an arrow F1 in FIG. 5, the insertion end (front end) of the card generally pushes the upper open guide surface 42, or the upper barrier surface 46 and/or the lower barrier surface 48 since the first door 32 is constantly biased toward the closed position thereof by the coil torsion spring 76 as mentioned above. If the insertion end of the card pushes the upper open guide surface 42, the first door 32 receives a force in the direction shown by the arrow F2 in FIG. 5 due to the direction of inclination of the upper open guide surface 42. Once such a force in the direction shown by the arrow F2 exceeds the spring force of the coil torsion spring 76, the first door 32 rotates from the closed position to the open position.

However, if the insertion end of the card pushes the upper barrier surface 46 and/or the lower barrier surface 48 after the card is inserted into the card slot 24 through the insertion opening 24a, the first door 32 receives a force in the direction shown by the arrow F3 in FIG. 5 due to the direction of inclination of the upper and lower barrier surfaces 46 and 48. Such a force in the direction shown by the arrow F3 acts on the first door 32 so as to rotate the first door 32 toward the closed position, so that the first door 32 does not open to thereby prevent the card from entering the card slot 24 beyond the first door 32. The first door 32 does not rotate in the closing direction beyond the closed position thereof even if the first door 32 receives a force in the direction shown by the arrow F3 when the first door 32 is held in the closed position because the first door 32 is prevented from rotating in the closing direction beyond the closed position thereof by the connection members 72b and 74b of the upper and lower stoppers 72 and 74, respectively.

As can be understood from the above, the first and second doors 32 and 34 cannot be made to rotate toward their open positions at the same time unless the upper and lower open guide surfaces 42 and 60 are concurrently pushed in the card insertion direction. Space "W" shown in FIG. 3 between the upper and lower open guide surfaces 42 and 60 is determined to correspond to the width of a compatible removable memory card 22. Therefore, even if an incompatible card or the like having a width smaller than the space W is inserted into the card slot 24 via the insertion opening 24a, at least one of the first and second doors 32 and 34 remains closed, since either only one of the upper and lower open guide surfaces 42 and 60, or neither of them, is pushed by the inserted incompatible card, or the like, so that the barrier surfaces of both or one of the first and second doors 32 and 34 prevent the inserted incompatible card, or the like, from entering the card slot 24 beyond the barrier surfaces. In other words, the first and second doors 32 and 34 cannot be made to open at the same time by any incompatible card, or the like, whose width is smaller than that of the compatible removable memory card 22 and which cannot push the upper and lower open guide surfaces 42 and 60 at the same time. As a result, such an incompatible card, or the like, cannot reach the inner end of the card slot 24 to be engaged with the receptacle 26.

For instance, if an incompatible card 22' whose width is smaller than the aforementioned space "W" is inserted into the card slot 24 via the insertion opening 24a in a manner as shown in FIGS. 4 and 6, the first door 32 does not rotate counterclockwise, as viewed in FIG. 6, and thus remains in the closed position even if the incompatible card 22' pushes the lower open guide surface 60 of the second door 34 to thereby rotate the second door 34 in a direction toward the open position since the incompatible card 22' does not push the upper open guide surface 42 of the first door 32. Consequently, the insertion end of the incompatible card 22' pushes the upper and lower barrier surfaces 46 and 48 of the first door 32 but cannot enter the card slot 24 beyond the first door 32. If the insertion end of the incompatible card 22' pushes the upper and lower barrier surfaces 46 and 48 of the first door 32 in the direction shown by the arrow F1, the first door 32 receives a force in the closing direction due to the direction of inclination as mentioned above, so that the first door 32 remains held in the closed position thereof.

Although not shown in the drawings, the second door 34 remains held in the closed position thereof by a pushing force of the insertion end of the incompatible card 22' against the upper and lower barrier surfaces 64 and 66 of the second door 34 in the case where the incompatible card 22' does not push the upper and lower open guide surfaces 42 and 60 at the same time but only the upper open guide surface 42 of the first door 32, similar to the aforementioned case where the incompatible card 22' pushes only the lower open guide surface 60 of the second door 34. Both the first and second doors 32 and 34 remain held in the closed position thereof by a pushing force of the insertion end of the incompatible card 22' against all the four barrier surfaces 46, 48, 64 and 66 of the first and second doors 32 and 34, in the case where an incompatible card 22' pushes neither the upper open guide surface 42 nor the lower open guide surface 60, because neither the first door 32 nor the second door 34 is rotated in the opening direction thereof.

On the other hand, as shown in FIG. 7, when the compatible removable memory card 22 that has the width corresponding to the space "W" shown in FIG. 3 is properly inserted into the card slot 24 via the insertion opening 24a, both the first and second door 32 and 34 are rotated due to the insertion of the removable memory card 22 in the card insertion direction, so that the removable memory card 22 can reach the inner end of the card slot 24 to be engaged with the receptacle 26. Upon the removable memory card 22 being fully inserted in the card slot 24, the connector portion 22a of the removable memory card 22 are respectively engaged with the series of contact pins 28 in the receptacle 26. Each of the first and second doors 32 and 34 remains in the open position thereof in a state where the removable memory card 22 is fully inserted in the card slot 24.

When the removable memory card 22 is taken out of the card slot 24, firstly the removable memory card 22 slides along the first and second doors 32 and 34 in remaining in contact therewith, and thereafter the first and second doors 32 and 34 are rotated back to the closed position from the open position by the spring force of the coil torsion springs 76 and 78 after the removable memory card 22 is completely taken out of the card slot 24.

As can be understood from the above discussion, according to the card slot door locking mechanism to which the present invention is applied, since the upper and lower open guide surfaces 42 and 60 are respectively formed on the first and second doors 32 and 34 to be a predetermined distance (which corresponds to the width of the compatible removable memory card 22) apart from each other, and since the upper and lower barrier surfaces (46 and 48, or 64 and 66) are formed on each of the first and second doors 32 and 34 between the upper and lower open guide surfaces 42 and 60 so as to hold at least one of the first and second doors 32 and 34 in the closed position thereof by a pushing force of the insertion end of an incompatible card or the like against the upper and/or lower barrier surface of either or both the first and second doors 32 and 34, any incompatible removable card or foreign object can be prevented from entering into the card slot 24, without requiring the digital camera 10 to have any additional card slot door locking mechanism having a complicated structure. Since all the four barrier surfaces 46, 48, 64 and 66 of the first and second door 32 and 34 are positioned in the card slot 24 behind the upper and lower open guide surfaces 42 and 60 in the card insertion direction, none of the four barrier surfaces 46, 48, 64 and 66 can interfere with a memory card, which pushes the upper and lower open guide surfaces 42 and 60 when the memory card is inserted into the card slot 24 if the inserted memory card is a compatible removable memory card 24 having a compatible width.

Figure 10:
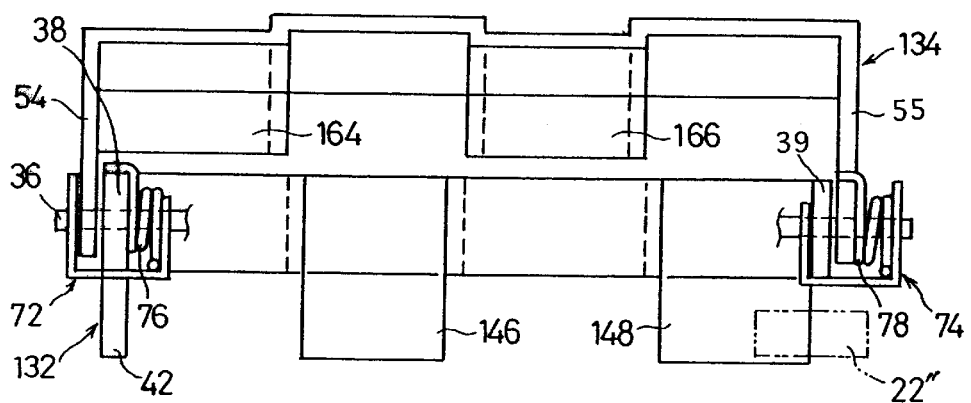
FIG. 10 is a plan view of the card slot door locking mechanism shown in FIG. 9 in an open state, seen from the insertion opening of the card slot.
Figure 9:
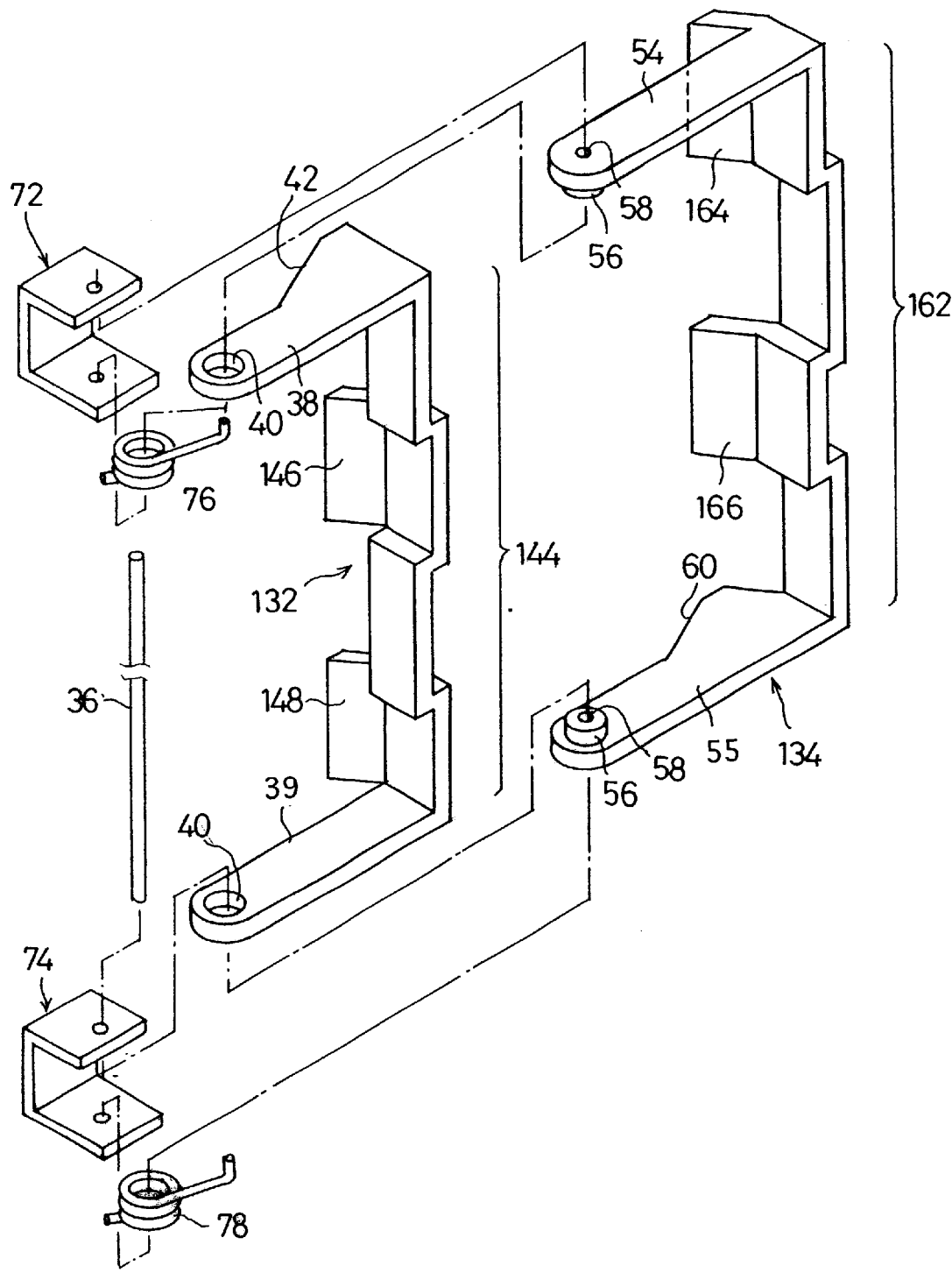
FIG. 9 is a view similar to that of FIG. 2 and illustrates fundamental elements of another embodiment of the card slot door locking mechanism.

FIGS. 9 and 10 show a second embodiment of the card slot door locking mechanism according to the present invention. The second embodiment is substantially identical to the first embodiment except that the upper and lower barrier surfaces of each of first and second doors 132 and 134 (which respectively correspond to the first and second doors 32 and 34 in the first embodiment) in the second embodiment are formed reverse to those of the corresponding door 32 or 34 in the first embodiment in position. Namely, barrier plates (barrier arm) 144 and 162 of the second embodiment, which respectively correspond to the barrier plates 44 and 62 in the first embodiment, are formed so that the upper and lower barrier surfaces of each of the first and second doors 132 and 134 in the second embodiment are formed reverse to those of the corresponding door 32 or 34 in the first embodiment in position. More specifically, the upper barrier surface 164 of the second door 134 is formed so as to be adjacent to the upper open guide surface 42 of the first door 132, while the lower barrier surface 148 of the first door 132 is formed so as to be adjacent to the lower open guide surface 60 of the second door 134.

According to the second embodiment having the above-described structure, an incompatible removable card or foreign object can be prevented from entering into the card slot 24 even if they have very small width because the upper or lower barrier surface (146 and 148, or 164 and 166) of one of the first and second doors 132 and 134 is positioned adjacent to the open guide surface 42 or 60 of the other of the first and second doors 132 and 134. For instance, even if a card 22" (see FIG. 10) having a width smaller than that of any barrier surface of the first and second doors 132 and 134 pushes the lower open guide surface 60 of the second door 134 to rotate the same toward the open position thereof as shown in FIG. 10, the card 22" is prevented from entering the card slot 24 beyond the point where the card 22" contacts with the lower barrier surface 148 of the first door 132, since the lower barrier surface 148 is positioned adjacent to the lower open guide surface 60 of the second door 134. Likewise, the card 22" is prevented from entering the card slot 24 beyond the point where the card 22" contacts with the upper barrier surface 164 of the second door 134 even if the card 22" pushes the upper open guide surface 42 of the first door 132 to rotate the same toward the open position thereof (such a state is not shown in the drawings).

In each of the first and second embodiments, the upper and lower open guide surfaces 42 and 60 of the first and second doors 32 (132) and 34 (134) substantially lie at the same position in the card insertion direction (e.g., the horizontal direction as viewed in each of FIGS. 5, 6 and 8), while also all the four barrier surfaces of the first and second doors 32 (132) and 34 (134) substantially lie at the same position in the card insertion direction. According to this arrangement, the upper and lower barrier surfaces of the first and second doors 32 (132) and 34 (134) can be arranged along the lengthwise direction of the insertion opening 24a of the card slot in an alternate configuration, so that the space in the card slot 24 that is necessary for the first and second doors 32 (132) and 34 (134) to be disposed therein can be made small.

However, the present invention is not limited solely to the above particular embodiments. For instance, the first and second doors 32 (132) and 34 (134) can be disposed apart from each other in the card insertion direction. Namely, the first door 32 (132) can be disposed to be close to the insertion opening 24a of the card slot 24 while the second door 34 (134) can be disposed to be close to the receptacle 26. In this case, when the compatible removable memory card 24 is inserted into the card slot 24 through the insertion opening 24a, firstly the first door 32 (132) opens by a push of the insertion end of the removable memory card 24 against the upper open guide surface 42 of the first door 32 (132). Subsequently, a further movement of the removable memory card 24 in the card insertion direction causes the insertion end of the removable memory card 24 to push the lower open guide surface 60 of the second door 34 (134) to thereby open the second door 34 (134). Of course, the first door 32 (132) can be disposed to be close to the receptacle 26 while the second door 34 (134) can be disposed to be close to the insertion opening 24a of the card slot 24.

Accordingly, in the above illustrated embodiments according to the present invention, to push the pair of open guide surfaces (upper and lower open guide surfaces 42 and 60) concurrently by inserting a card into the card slot through the insertion opening thereof not only means that the moment when the card commences pushing the open guide surface (42 or 60) of one of the first and second doors 32 (132) and 34 (134) corresponds to the moment when the same card commences pushing the open guide surface (60 or 42) of the other door, but also can mean that the card firstly pushes the open guide surface (first open guide surface) 42 or 60 of one of the first and second doors 32 (132) and 34 (134) and subsequently pushes the open guide surface (second open guide surface) 60 or 42 of the other door while pushing the first open guide surface. Therefore, it can be said that the pair of open guide surfaces (upper and lower open guide surfaces 42 and 60) do not have to start being pushed by a card simultaneously, and that there may be a time difference between the moment when the card commences pushing the open guide surface 42 or 60 of one of the first and second doors 32 (132) and 34 (134) the moment when the same card commences pushing the open guide surface 60 or 42 of the other door.

The present invention can be applied to not only a card slot of a digital camera but also a card slot (e.g., PC Card slot) of any other mobile terminal equipment such as a laptop computer. In the above illustrated embodiments, not only incompatible cards, but also objects other than card-shaped objects can be effectively prevented from entering the card slot beyond the first and second doors 32 (132) and 34 (134).

As can be understood from the foregoing, according to the card slot door locking mechanism to which the present invention is applied, the card slot door locking mechanism having simple and low-cost structure makes it possible to effectively prevent any incompatible removable card or foreign object from entering into the card slot.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A card slot door locking mechanism comprising:
   a pair of doors, each of said pair of doors being rotatable between a closed position to close a card slot and an open position to allow a removable card to be inserted into said card slot, and being biased to said closed position;
   a pair of open guide surfaces, each of said pair of open guide surfaces being formed on each respective door of said pair of doors so that said pair of doors concurrently rotate to said open position when said pair of open guide surfaces are concurrently pushed by said removable card, said pair of open guide surfaces being apart from each other in a lengthwise direction of said card slot; and a pair of barrier surfaces, each of said pair of barrier surfaces being formed on each respective door of said pair of doors, positioned between said pair of open guide surfaces in said lengthwise direction of said card slot, so that at least one of said pair doors is prevented from rotating toward said open position when at least one of said pair of barrier surfaces is pushed by an object other than said removable card without pushing said pair of open guide surfaces concurrently.

2. The card slot door locking mechanism according to claim 1, wherein each of said pair of open guide surfaces is inclined with respect to a card insertion direction so that a point on said each of said pair of open guide surfaces moves substantially toward the closing direction of each respective said pair of doors as said point moves along said card insertion direction.

3. The card slot door locking mechanism according to claim 1, wherein each of said pair of barrier surfaces is inclined with respect to a card insertion direction so that a point on said each of said pair of barrier surfaces moves substantially toward the opening direction of each respective said pair of doors as said point moves along said card insertion direction.

4. The card slot door locking mechanism according to claim 1, further comprising at least one stopper which determines said closed position of each of said pair of doors.

5. The card slot door locking mechanism according to claim 1, wherein said card slot is incorporated in a digital camera, and wherein said removable card is a removable memory card in which image data is recorded.

6. A card slot door locking mechanism comprising:
a first door and a second door, each of said first and second doors being rotatable between a closed position to close a card slot and an open position to allow a removable card to be inserted into said card slot, and being biased to said closed position;
a first open guide surface formed on said first door and a second open guide surface formed on said second door, said first and second open guide surfaces being apart from each other in a lengthwise direction of said card slot; and
a first barrier surface formed on said first door and a second barrier surface formed on said second door, said first and second barrier surfaces being positioned between said first open guide surface and said second open guide surface in said lengthwise direction of said card slot;
wherein said first door and said second door concurrently rotate to said open position when said first and second open guide surfaces are concurrently pushed toward a card insertion direction by said removable card; and
wherein at least one of said first and second doors is prevented from rotating toward said open position when at least one of said first and second barrier surfaces is pushed toward said card insertion direction by an object other than said removable card without pushing said first and second open guide surfaces concurrently.

7. The card slot door locking mechanism according to claim 6, wherein said first open guide surface is positioned closer to an insertion opening of said card slot than said first barrier surface,
and wherein said second open guide surface is positioned closer to said insertion opening of said card slot than said second barrier surface.

8. The card slot door locking mechanism according to claim 6, wherein each of said first door and said second door comprises:

two parallel arms, each of which is pivoted at one end thereof and extends substantially toward said card insertion direction from said one end which is pivoted; and
a barrier arm which extends between said two parallel arms in said lengthwise direction of said card slot to connect the other ends which are not pivoted of said two parallel arms together;
wherein said first open guide surface is formed on one of said two parallel arms of said first door,
wherein said second open guide surface is formed on one of said two parallel arms of said second door,
wherein said first barrier surface is formed on said barrier arm of said first door, and
wherein said second barrier surface is formed on said barrier arm of said second door.

9. The card slot door locking mechanism according to claim 8, wherein said two parallel arms of said first door and said two parallel arms of said second door are pivoted about a common shaft which extends substantially parallel to said lengthwise direction of said card slot.

10. The card slot door locking mechanism according to claim 6, wherein said first open guide surface and said second open guide surface substantially lie at the same position with respect to said card insertion direction, and
wherein said first barrier surface and said second barrier surface substantially lie at the same position with respect to said card insertion direction.

11. The card slot door locking mechanism according to claim 6, wherein said first barrier surface comprises a plurality of first barrier surfaces,
wherein said second barrier surface comprises a plurality of second barrier surfaces, and
wherein said plurality of first barrier surfaces and said plurality of second barrier surfaces are arranged along said lengthwise direction of said card slot in an alternate configuration.

12. The card slot door locking mechanism according to claim 6,
wherein said first barrier surface is positioned adjacent to said second open guide surface in said lengthwise direction of said card slot,
and wherein said second barrier surface is positioned adjacent to said first open guide surface in said lengthwise direction of said card slot.

13. A card slot door locking mechanism comprising:
a first door which is rotatable between a first-door-closed position, in which said first door closes a card slot, and a first-door-open position, in which said first door opens said card slot to allow a removable card to be inserted into said card slot, said first door being biased to rotate in a direction towards said first-door-closed position;
a second door which is rotatable between a second-door-closed position, in which said second door closes said card slot, and a second-door-open position, in which said second door opens said card slot to allow said removable card to be inserted into said card slot, said second door being biased to rotate in a direction towards said second-door-closed position;
a first open guide surface which is formed on said first door so that said first door rotates toward said open position thereof when a pushing force is applied against said first open guide surface in a card insertion direction;

a second open guide surface which is formed on said second door so that said second door rotates toward said open position thereof when a pushing force is applied against said second open guide surface in said card insertion direction;

a first barrier surface which is formed on said first door so as to prevent said first door from rotating toward said open position thereof when a pushing force is applied against said first barrier surface in said card insertion direction without applying a pushing force on said first open guide surface; and a second barrier surface which is formed on said second door so as to prevent said second door from rotating toward said open position thereof when a pushing force is applied against said second barrier surface in said card insertion direction without applying a pushing force on said second open guide surface;

wherein said first open guide surface and said second open guide surface are arranged apart from each other in a lengthwise direction of said card slot; and wherein said first barrier surface and said second barrier surface are positioned between said first open guide surface and said second open guide surface in said lengthwise direction of said card slot.

* * * * *